Figure 1:
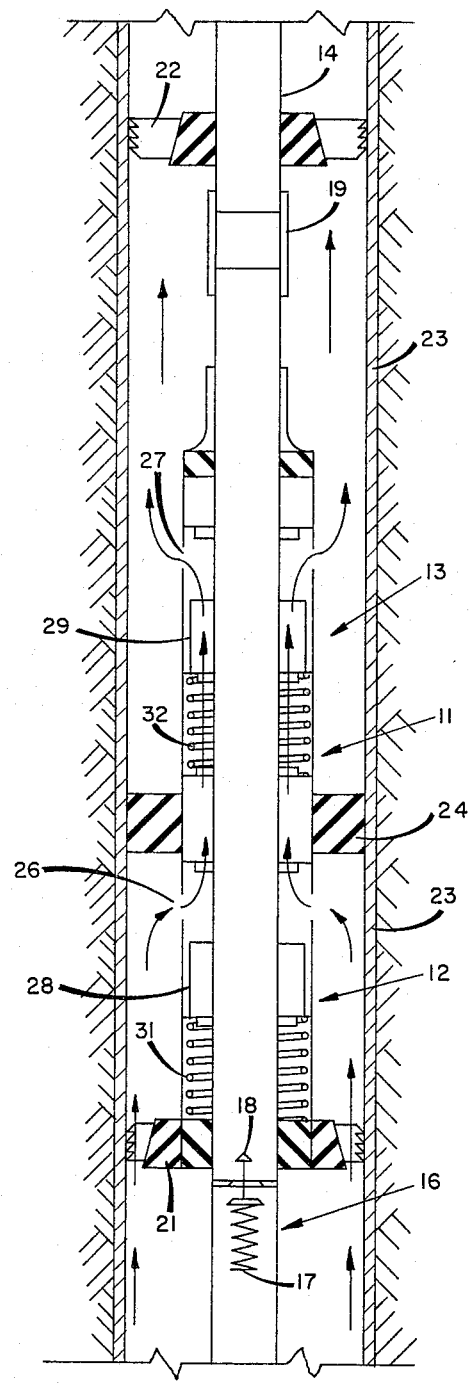

Nov. 29, 1966

G. C. HOWARD ET AL 3,288,221

SUBSURFACE SAFETY VALVE

Filed March 6, 1964

2 Sheets-Sheet 1

GEORGE C. HOWARD
LAWRENCE B. WILDER
INVENTORS

BY *William T. McClain*

ATTORNEY.

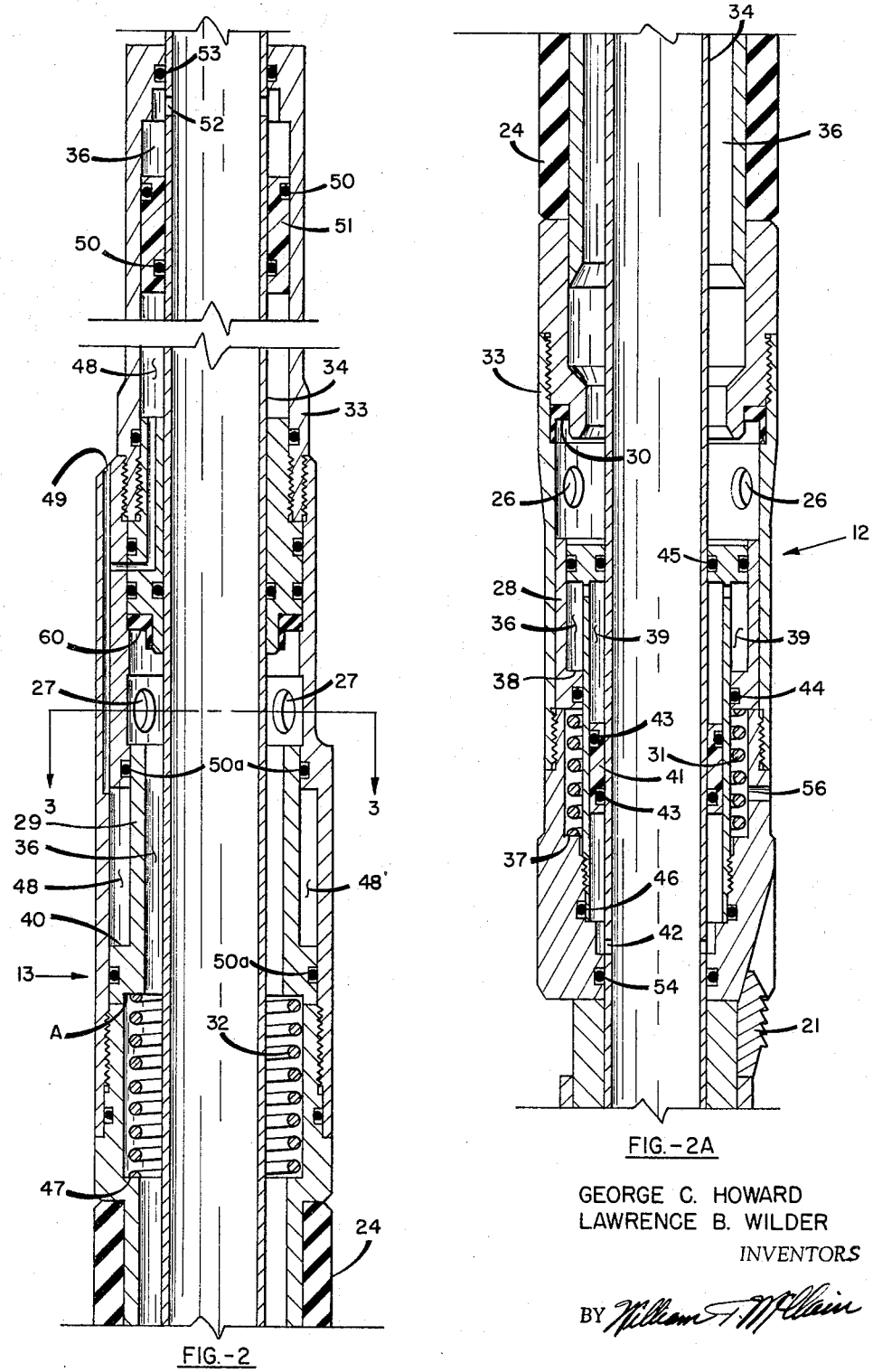

United States Patent Office 3,288,221
Patented Nov. 29, 1966

3,288,221
SUBSURFACE SAFETY VALVE
George C. Howard and Lawrence B. Wilder, Tulsa, Okla., assignors to Pan American Petroleum Corporation, Tulsa, Okla., a corporation of Delaware
Filed Mar. 6, 1964, Ser. No. 349,823
10 Claims. (Cl. 166—183)

This invention relates to valves for use in oil wells and the like, and more particularly it relates to a subsurface safety valve which can be hydraulically operated from a remote location.

Various types of subsurface safety valves have been employed to stop the flow of fluids produced from a well when for some reason the flow of produced fluids cannot be controlled. For example, such safety valves, or storm chokes as they are often referred to, are used in offshore wells to prevent blowouts which may result from damage to the wellhead or other equipment at the surface by storms, ships, or other objects. The subsurface safety valves are generally installed in the well at some distance below the surface, and there are commercially available valves which are hydraulically operated by a fluid supplied under pressure from the surface. In these devices any significant damage to the fluid supply causes the valve to close and stop the flow of fluids from the well. Typically, these devices may employ a sleeve-type valve wherein the sleeve is held open by the fluid under pressure and when the fluid pressure drops below a given level the valve is closed by a spring. Various difficulties have been encountered in maintaining the supply of pressured fluid to the valve during normal operations and difficulties in valve operation may result from particles of debris jamming the working parts of the valve so as to prevent satisfactory operation. Usually the clearances between the working parts of these valves are quite small and particles of rock or other such material can cause a jamming of the valve.

An object of the present invention is a subsurface safety valve which is actuated from a remote location, such as from the wellhead by hydraulic pressure of a fluid supplied by a control line. A further object of the invention is a valve which will fail safe, e.g., a control line break will close-in the well. A further object is such a valve wherein the production tubing or a special tubing string run into the well can be maintained open to permit the running of wire tools and/or the injection of fluids into the well. Still, another object of the invention is such a valve which can be periodically tested and then reset without undue complications. Still, a further object of the invention is such a valve which can be securely anchored against movement up or down near the wellhead but below where a break-off could occur. Another object of the invention is such a valve which can be installed in a well without the need for special landing nipples or similar devices. Still another object of the invention is such a valve which can be satisfactorily installed in mud-filled casing and which is capable of operating satisfactorily in the presence of particulate foreign matter, such as rock, scale and the like.

In accordance with the invention there is provided a subsurface safety valve which is hydraulically operated from the surface of the well so that damage to the equipment at the surface of the well closes-in the well. Typically, a spring-biased sleeve valve is maintained in the open position by a pressure fluid supplied through well tubing extending from the surface, and there is provided a sealed reservoir of hydraulic fluid with a floating annular piston between the pressure fluid and the sealed reservoir to exclude particles of foreign matter from the working parts of the valve. In one embodiment, a bottom-closed valve is provided with pressure fluid ports positioned below the hydraulic reservoir so that any particles of debris are flushed out of the valve mechanism when the valve is operated. In another embodiment, there is provided an improved double safety valve employing a combination of a bottom-closed valve and a top-closed valve.

Figure 3:
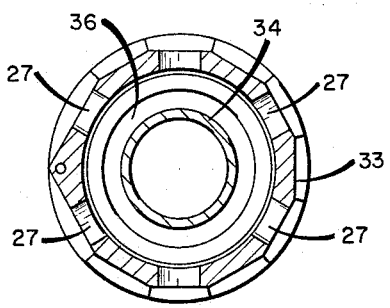

The present invention will be better understood by reference to the following description of a preferred embodiment of the invention and to the accompanying drawings wherein:

FIGURE 1 schematically illustrates a double safety valve, in accordance with the invention, for controlling the flow of fluids produced through the annulus between the safety valve and the well casing;

FIGURE 2 is a vertical cross-sectional view of one embodiment of a top-closed safety valve employed as the upper portion of a double safety valve;

FIGURE 2-A is a vertical cross-sectional view of an embodiment of a bottom-closed safety valve employed as the lower portion of a double safety valve; and FIGURE 3 is a horizontal cross-sectional view of the valve of FIGURE 2 taken at line 3—3.

Referring to the drawings, in FIGURE 1 the double safety valve 11 comprises a lower safety valve 12 and an upper safety valve 13. The safety valve 11 is adapted to be connected to a string of well tubing 14 which extends upwardly in the well to the earth's surface and is connected there to a source of fluid which is supplied to the tubing under pressure by a pump or other suitable apparatus. The pressure fluid is supplied through tubing 14 to the safety valve to operate the safety valve in the manner hereinafter described. In the tubing below the safety valve there is positioned a valve means 16, such as a commercially available spring-operated check valve, designed to prevent fluid from flowing upwardly in the tubing, but to permit fluid supplied from above through the tubing at a given minimum pressure to pass downwardly through the valve means. Typically, the check valve 16 is held in the closed position by a spring 17 which is calibrated to open upon the application from the top of a suitable fluid pressure, e.g., about 2000 p.s.i.g. This permits maintaining the desired pressure in the tubing above the check valve so that the safety valve can be maintained in the open position during normal operation. Preferably, the check valve is of the removable type and is provided at the upper end with a fishing neck 18 which may be engaged with fishing tools lowered through the tubing to remove the check valve when this is desirable.

In installing the safety valve, it is connected into the tubing string, as by coupling 19, with a tubing anchor 21, or a set of casing slips, provided at the lower end of the valve and a set of hydraulic hold-down slips 22 near the upper end of the valve to secure the valve 11 at the desired subsurface location in casing 23. The casing slips at the lower end may be one of several commercially available types of slips which frictionally engage with the inner wall of the well casing 23 to prevent the downward movement of the tubing in the casing. The hydraulic hold-down slips near the upper end of the valve similarly engage with the inner wall of the casing to prevent the upward motion of the tubing and the valve in the casing. Such slips for use in anchoring tubing in casing are well known in this art, and it is not believed necessary to describe them in detail herein. While the lower casing slips may be employed alone to secure the tubing in the well at the desired depth, it is preferred to provide the upper hydraulic hold-down slips so that any damage to the well above the valve will not pull the valve upwardly in the well or otherwise dislocate it from its intended position. A sealing means, such as a mechanical compression-type packer 24 is provided on the exterior of the valve between the inlet ports 26 and the outlet ports 27 to block off the flow of fluid in the annulus between the tubing and the casing. Fluid flow through the valve is controlled by lower valve sleeve 28 and upper valve sleeve 29 which cooperate with inlet ports 26 and outlet ports 27, respectively, to prevent the flow of fluid through the ports when moved upwardly to the closed positions by valve springs 31 and 32, respectively.

Turning now to FIGURES 2, 2–A and 3, the casing annulus safety valve shown in the drawings comprises a cylindrical tubular outer housing member 33 and a centrally positioned cylindrical inner tubular member 34 radially spaced to provide an elongated annular space 36 between these members. As described above, the safety valve is made up in a string of tubing and lowered in the well casing to the desired depth at which it is positioned through the use of the slips as described above. The inner tubular member 34 is connected into the string of well tubing and forms a part of the tubing. A suitable pump or other supply means is employed at the surface to supply a suitable fluid under a preselected pressure through the well tubing to the valve to maintain the safety valve in the open position during normal operations.

Slidably positioned in the annular space 36 and adjacent inlet ports 26 is a cylindrical valve sleeve element 28, fabricated from steel or other suitable material, which normally is in the open position, as shown, to permit fluids to flow from the casing annulus into the valve through ports 26 spaced around the periphery of the housing. Sleeve 28 is biased toward the upward, or closed, position by compression spring 31 located between the top side of lower shoulder 37 provided near lower end of the interior of housing member 33 and the bottom side of shoulder 38 provided on the lower end of sleeve 28. Hydraulic reservoir 39 is provided in annular space 36 between a lower floating piston 41, fabricated from Teflon or other suitable material, and sleeve 28. Upon assembly of the valve, the hydraulic reservoir is filled with a hydraulic oil or other suitable liquid to hydraulically connect the working end of piston 41 to sleeve 28.

Pressure fluid supplied by tubular element 34 passed through pressure fluid ports 42 spaced around the wall of tubular element 34 urges piston 41 upwardly in reservoir 39, and the pressure of the pressure fluid is transmitted thereby to the fluid in hydraulic reservoir 39 and to the top side of shoulder 38 on sleeve 28 to bias the cylindrical sleeve 28 toward the open position. This embodiment of the safety valve is referred to herein as a "bottom-closed" valve, since the power end of piston 41, i.e., the end exposed to the pressure fluid, faces downwardly in the valve. Thus, as long as the pressure of the fluid in tubular element 34 is sufficient to overcome the force of spring 31, the ports 26 remain open. When the pressure fluid supply drops, as when damage occurs to the wellhead to cut off the pressure fluid supply, spring 31 drives sleeve 28 upwardly to the closed position. Upon moving to the closed position, sleeve 28 contacts sealing member 30 to effect a fluid-tight seal at the upper end of the sleeve. Sealing member 30 is formed of a resilient material compatible with the flowing fluid and constructed with a self-sealing lip on the high pressure side so that increased fluid pressure effects a tighter seal. This sealing member is positioned to be out of the main flow path of the fluid flowing through the valve to reduce erosion of the member. Contamination of the hydraulic fluid in reservoir 39 by the pressure fluid is prevented by the use of sealing rings 43 provided on piston 41. Similarly, sealing rings 44 and 45 prevent the loss of the hydraulic fluid from the reservoir. The volume provided in reservoir 39, of course, may be great enough so that any small loss of fluid from the reservoir over a period of time does not significantly affect the operation of the valve.

In one preferred embodiment, pressure fluid ports 42 are positioned below the point of communication of the pressure fluid supply and the reservoir so that particles of rock or other debris which may accumulate in the pressure fluid ports and have a tendency to jam the working parts of the valve are flushed from the valve by the repeated operation of the valve. Preferably, ports 42 are located below piston 41 and adjacent the lowermost portion of compartment 46, as shown. Particles of rock, scale or other debris normally have a greater density than the fluids and will tend to settle to the bottom of compartment 46 so that as piston 41 moves downwardly in the annular space, pressure fluid is expelled from compartment 46 into tubular element 34 so as to pass downwardly out of the valve.

The main functions of piston 41 are to prevent contamination of the fluid sealed in reservoir 39 by the pressure fluid, to transmit the pressure of the pressure fluid to the reservoir fluid and to prevent the passage of foreign particles into the valve mechanism. However, where the reservoir oil is of the same density or is lighter than the pressure fluid and contamination is not a problem, floating piston 41 may be omitted and pressure fluid ports 42 when positioned as shown will prevent the plugging of the valve mechanism by foreign particles by the flushing action described above.

As described above, well fluids enter the valve through inlet ports 26 and flow upwardly through annular space 36 in upper valve 13 and exit from the valve through outlet ports 27. Cylindrical sleeve element 29 is similar in construction to sleeve 28 and may be fabricated of the same materials. Compression spring 32 seated on the top side of shoulder 47 in the outer housing biases sleeve element 29 toward the upward, or closed, position. Upper valve 13 is similar in construction to lower valve 12 described above except that this latter valve is closed by the pressure of pressure fluid supplied above floating piston 51, constructed of Teflon or other suitable material, and is referred to as a "top-closed" valve. As shown, an upper hydraulic reservoir 48 is filled with a suitable hydraulic fluid through fill port 49 which is plugged to seal the reservoir. The working end of upper floating piston 51 is hydraulically connected through the hydraulic fluid in reservoir 48 by hydraulic passages as shown to the top side of shoulder 40 on sleeve 29 to bias the valve. Pressure fluid from tubular member 34 passes through upper pressure fluid ports 52 into annular space 36, and the hydraulic pressure is transmitted by upper piston 51 to the fluid sealed in hydraulic reservoir 48 to bias sleeve 29 toward the downward, or open position. As hereinbefore described, sufficient hydraulic pressure in tubular element 34 maintains the valve in the open position, and when this pressure falls below that sufficient to overcome the combined force resulting from spring 32 and the well pressure on area A, the sleeve 29 is moved upwardly over port 27 into the closed position. When in the closed position, the upper end of sleeve 29 contacts sealing member 60 to effect a fluid-tight seal. Sealing member 60 is preferably constructed in the same manner as sealing member 30 described above. As mentioned above, sealing rings 50 and 50a may be employed between the working parts of the valve mechanism to prevent the accumulation of debris in the valve mechanism and to prevent the loss or contamination of fluids.

The outer housing member 33 is sealed to inner tubular member 34 by sealing rings 53 and 54 provided at the upper and lower ends of annular space 36 to effect a fluid-tight seal between these members. As shown in FIGURE 2–A, if desired, pressure equalization port 56 may be employed in the wall of outer housing member 33 to permit fluid to enter the valve so as to balance the pressure exerted on the top of sleeve 28 as a result of fluid entering the valve through inlet ports 26.

While the valve of the invention has been described in connection with a preferred double safety valve, it is to be understood that either of the mechanisms described in connection with FIGURES 2 and 2–A may be employed alone as a single safety valve, if desired. Further, the above valve has been described as a casing annulus safety valve; however, it is to be understood that the concept of the invention may be employed in where it is desired to flow the produced fluids through the tubing rather than through the casing-tubular annulus. Likewise, separate or external pressure fluid conduits may be employed in lieu of supplying the pressure fluid through the central tubing as described above.

We claim:

1. A valve device comprising:
    an elongated central tubular member adapted to be connected into a string of conduit;
    an elongated outer tubular member encasing said central member;
    said outer member being radially spaced from said central member to provide an annular space therebetween, and being sealed to said central member in a fluid-tight manner at both the upper and lower ends thereof;
    inlet port means and outlet port means in one of said tubular members placing said annular space in flow communication with the exterior of said tubular member, said port means being spaced apart along the length of said tubular member;
    valve sleeve means slidably positioned in said annular space to move between an open position and a closed position and to control the flow of fluid through said port means;
    resilient means acting on said sleeve means to bias said sleeve means toward the closed position;
    a hydraulic reservoir hydraulically connected to said sleeve means so that hydraulic pressure therein biases said sleeve means toward the open position;
    a floating piston slidably positioned in said annular space and having its working end hydraulically connected to said reservoir; and
    presure fluid port means for supplying a pressured fluid to the power end of said floating piston.

2. The valve of claim 1 wherein said valve is adapted to be installed in the vertical position and wherein said pressure fluid port means is positioned below said floating piston.

3. The valve of claim 1 wherein said central member is adapted to supply said pressured fluid to said valve and said pressure fluid port means is positioned in said central member to place the interior of said central member in flow communication with the power end of said floating piston.

4. A casing annulus safety valve adapted to be installed in a string of well tubing below the surface of the earth and to be operated from the surface, which valve comprises:
    an elongated cylindrical central tubular member adapted to be connected into a tubing string extending downwardly from the earth's surface into a well;
    an elongated cylindrical outer tubular member encasing said central member;
    said outer member being radially spaced from said central member to provide an elongated annular space therebetween and being sealed to said central member in a fluid-tight manner above and below said annular space;
    inlet port means and outlet port means in said outer member, each placing said annular space in flow communication with the exterior of said outer member, said port means being spaced apart along the length of said outer member;
    valve sleeve means slidably positioned in said annular space between said port means to slide therein between an open position and a closed position and to control the flow of fluid through said port means;
    resilient means acting on one end of said sleeve means to bias said sleeve means toward the closed position;
    a sealed hydraulic reservoir hydraulically connected to said sleeve means so that hydraulic pressure therein biases said sleeve means toward the open position;
    a cylindrical floating piston slidably positioned in said annular space and having its working end hydraulically connected to said reservoir;
    pressure fluid port means in said central member for supplying a pressured fluid from the interior of said central member to the power end of said floating piston to bias said sleeve means toward the open position;
    valve means in said central member below said pressure fluid port means for maintaining said pressured fluid supplied to said central member at a preselected pressure.

5. The valve of claim 4 wherein said pressure fluid port means is positioned below said floating piston, whereby debris is flushed from said pressure fluid port means by the repeated operation of said valve.

6. The valve of claim 4 including packer means on the exterior of said outer member between said inlet port means and said outlet port means to block the flow of fluid in the annulus between said valve and the casing in which it is inserted.

7. A subsurface safety valve comprising:
    an elongated central tubular member adapted to be connected into a string of well tubing extending downwardly from the earth's surface into a well;
    an elongated outer tubular member encasing said central member;
    said outer member being radially spaced from said central member to provide an elongated annular space therebetween and being sealed to said central member in a fluid-tight manner at both ends of said annular space;
    inlet port means and outlet port means in one of said tubular members, each placing said annular space in flow communication with the exterior of said tubular member, said port means being spaced apart along the length of said tubular member;
    valve sleeve means slidably positioned in said annular space between said port means to move between an open position and a closed position and to control the flow of fluid through said port means;
    resilient means acting on said sleeve means to bias said sleeve means towards the closed position;
    a hydraulic reservoir in said annular space adapted to contain hydraulic fluid therein so that pressure of said hydraulic fluid biases said sleeve means towards the open position;
    means for supplying a pressured fluid from the surface to said valve;
    presure fluid port means placing said fluid supply means in flow communication with said hydraulic reservoir whereby pressure of said fluid supplied from the surface biases said sleeve means towards the open position;
    said pressure fluid port means being positioned below the point of communication between said pressured fluid supply means and said reservoir so that debris accumulating in said pressure fluid port means is flushed therefrom by the repeated operation of said valve.

8. The valve of claim 7 including a floating piston positioned in said annular space between said pressure fluid port means and said hydraulic reservoir.

9. The valve of claim 7 wherein said inlet port means and said outlet port means are positioned in said outer member and said pressure fluid port means is positioned in said inner member, and including check valve means in said central member below said pressure fluid port means for maintaining a preselected fluid pressure in said central member.

10. A casing annulus safety valve adapted to be installed in a string of well tubing below the surface of the earth and to be operated from the surface, which valve comprises:

an elongated cylindrical central tubular member adapted to be connected into a tubing string extending downwardly from the earth's surface into a well casing;

an elongated cylindrical outer tubular member encasing said central member;

said outer member being radially spaced from said central member to provide an elongated annular space therebetween and being sealed to said central member in a fluid-tight manner at the upper and lower ends thereof;

inlet port means in said outer member near the lower end thereof;

outlet port means in said outer member near the upper end thereof;

each of said port means placing said annular space in flow communication with the exterior of said outer member;

packer means on the exterior of said outer member between said port means;

first valve sleeve means adjacent said inlet port means and slidably positioned in said annular space to slide therein between an open position and a closed position and to control the flow of fluid through said inlet port means;

first resilient means acting on one end of said first sleeve means to bias said first sleeve means toward the closed position;

a first sealed hydraulic reservoir hydraulically connected to the other end of said first sleeve means so that hydraulic pressure therein biases said first sleeve means toward the open position;

a first cylindrical floating piston slidably positioned in said annular space and having its working end hydraulically connected to said first reservoir;

first pressure fluid port means in said central member for supplying a pressured fluid from the interior of said central member to the power end of said first floating piston to bias said first sleeve means toward the open position, said first pressure fluid port means being positioned below the point of communication between said pressured fluid supply and said reservoir so that debris accumulated in said pressure fluid port means is flushed therefrom by the repeated operation of said valve;

second valve sleeve means slidably positioned in said annular space adjacent said outlet port means to slide therein between an open position and a closed position and to control the flow of fluid through said outlet port means;

second resilient means acting on one end of said second sleeve means to bias said second sleeve means toward the closed position;

a second sealed hydraulic reservoir hydraulically connected to said second sleeve means so that hydraulic pressure therein biases said second sleeve means toward the open position;

a second cylindrical floating piston slidably positioned in said annular space and having its working end hydraulically connected to said second reservoir;

second presure fluid port means in said central member for supplying a pressured fluid from the interior of said central member to the power end of said second piston to bias said second sleeve means toward the open position; and check valve means positioned in said central member below said first pressure fluid port means for maintaining said pressured fluid supply in said central member at a preselected pressure.

References Cited by the Examiner
UNITED STATES PATENTS

| | | | |
|---|---|---|---|
| 2,963,089 | 12/1960 | Sizer | 166—72 |
| 3,007,524 | 11/1961 | Pistole et al. | 166—224 |
| 3,156,300 | 11/1964 | Page et al. | 166—224 X |
| 3,157,233 | 11/1964 | Sizer et al. | 166—224 |

CHARLES E. O'CONNELL, *Primary Examiner.*

D. H. BROWN, *Assistant Examiner.*